(12) United States Patent
Park

(10) Patent No.: US 6,857,776 B2
(45) Date of Patent: Feb. 22, 2005

(54) CONNECTORIZED HIGH-TEMPERATURE THERMOCOUPLE

(75) Inventor: Sun Park, Woburn, MA (US)

(73) Assignee: Ametek, Inc., Paoli, PA (US)

( * ) Notice: Subject to any disclaimer, the term of this patent is extended or adjusted under 35 U.S.C. 154(b) by 0 days.

(21) Appl. No.: 10/317,688

(22) Filed: Dec. 12, 2002

(65) Prior Publication Data
US 2004/0114664 A1 Jun. 17, 2004

(51) Int. Cl.⁷ .............................. G01K 7/02; G01K 1/14; H01L 35/02
(52) U.S. Cl. ....................... 374/179; 374/141; 374/208; 136/230
(58) Field of Search ............................... 374/179, 208, 374/180, 141, 163, 187; 136/232–234, 200, 230

(56) References Cited

U.S. PATENT DOCUMENTS

| | | | |
|---|---|---|---|
| 2,820,839 A | 1/1958 | Schunke | 136/4 |
| 2,888,508 A | 5/1959 | Rademacher | 136/4 |
| 3,015,234 A | 1/1962 | Springfield | 73/339 |
| 3,018,663 A | 1/1962 | Dunlop | 73/341 |
| 3,263,502 A | 8/1966 | Springfield | 73/341 |
| 3,589,192 A * | 6/1971 | Sabovik | 136/230 |
| 3,637,438 A | 1/1972 | Springfield | 136/230 |
| 3,923,552 A | 12/1975 | Parris | 136/234 |
| 4,098,122 A | 7/1978 | Landman et al. | 73/341 |
| 4,114,442 A | 9/1978 | Pratt | 73/341 |
| 4,132,114 A | 1/1979 | Shah et al. | 73/343 R |
| 4,166,389 A * | 9/1979 | Montren | 374/158 |
| 4,186,605 A | 2/1980 | Bourigault | 73/341 |
| 4,233,889 A | 11/1980 | Nederman | 98/115 VM |
| 4,480,930 A | 11/1984 | DeZubay | 374/134 |
| 4,510,343 A * | 4/1985 | Sivyer | 136/242 |
| 4,571,689 A | 2/1986 | Hildebrand et al. | 364/481 |
| 4,578,688 A * | 3/1986 | Okuno | 347/118 |
| 4,590,326 A * | 5/1986 | Woldy et al. | 136/233 |
| 4,595,298 A | 6/1986 | Frederick | 374/144 |
| 4,605,315 A | 8/1986 | Kokoszka et al. | 374/144 |
| 4,698,454 A | 10/1987 | Moore | 136/233 |
| 4,854,729 A | 8/1989 | Lovato | 374/141 |
| 4,984,904 A * | 1/1991 | Nakano et al. | 374/139 |
| 5,005,986 A * | 4/1991 | Najjar et al. | 374/179 |

(List continued on next page.)

Primary Examiner—Gail Verbitsky
(74) Attorney, Agent, or Firm—Hayes Soloway P.C.

(57) ABSTRACT

A high-temperature connectorized thermocouple probe assembly for use in land gas turbine environments consistent with the present invention comprises a thermocouple junction having a plurality of conductors, a high temperature connector having at least one conductor, a length of cable having at least one conductor coupling at least one of the conductors of the thermocouple junction with at least one conductor of the high temperature connector; and a bushing disposed around the length of cable. In a further aspect, a land gas turbine system consistent with the present invention comprises a land gas turbine and a thermocouple probe assembly disposed at least partly within the land gas turbine, wherein the thermocouple probe assembly comprises a thermocouple junction and a high temperature connector coupled to the thermocouple junction, and wherein the thermocouple probe assembly is removably connected to, or is adapted for removable connection to, the land gas turbine via the high temperature connector. The land gas turbine system may further comprise a device for housing the thermocouple probe assembly, wherein the thermocouple probe assembly further comprises a length of cable coupling the thermocouple junction with the high temperature connector and a bushing disposed around the length of cable, wherein the bushing is adapted to mate with a corresponding stop in the device for housing the thermocouple probe assembly. The high temperature connector may be adapted to operate in a temperature of at least approximately 800 degrees F.

22 Claims, 3 Drawing Sheets

U.S. PATENT DOCUMENTS

| | | | | |
|---|---|---|---|---|
| 5,022,766 A | | 6/1991 | Phipps | 374/209 |
| 5,106,203 A | | 4/1992 | Napoli et al. | 374/144 |
| 5,116,137 A | | 5/1992 | Xiong et al. | 374/132 |
| 5,158,365 A | | 10/1992 | Kreuz | 374/138 |
| 5,165,225 A | | 11/1992 | Lampe et al. | 60/39.33 |
| 5,180,227 A | * | 1/1993 | John et al. | 374/131 |
| 5,185,996 A | * | 2/1993 | Smith et al. | 60/772 |
| 5,193,912 A | * | 3/1993 | Saunders | 374/179 |
| 5,226,731 A | | 7/1993 | Allen | 374/124 |
| 5,232,517 A | | 8/1993 | Hilborn et al. | 136/233 |
| 5,242,226 A | * | 9/1993 | Ross et al. | 374/208 |
| 5,382,093 A | | 1/1995 | Dutcher | 374/208 |
| 5,404,760 A | | 4/1995 | Robinson et al. | 73/863.11 |
| 5,423,610 A | | 6/1995 | Stansfeld et al. | 374/179 |
| 5,483,041 A | * | 1/1996 | Peck et al. | 219/390 |
| 5,505,544 A | | 4/1996 | Hunt | 374/166 |
| 5,641,231 A | | 6/1997 | Inaba | 374/137 |
| 5,697,706 A | | 12/1997 | Ciaravino et al. | 374/166 |
| 5,741,072 A | | 4/1998 | Yamaguchi et al. | 374/179 |
| 5,863,123 A | * | 1/1999 | Lee | 374/179 |
| 5,917,145 A | * | 6/1999 | Parent et al. | 136/234 |
| 5,999,081 A | * | 12/1999 | Hannigan et al. | 338/28 |
| 6,045,261 A | * | 4/2000 | Rossum et al. | 374/208 |
| 6,053,632 A | * | 4/2000 | Leininger | 374/130 |
| 6,239,351 B1 | | 5/2001 | Hall, Jr. | 136/227 |
| 6,302,578 B1 | * | 10/2001 | Stevenson et al. | 374/179 |
| 6,536,950 B1 | * | 3/2003 | Green et al. | 374/179 |
| 6,639,505 B2 | * | 10/2003 | Murata et al. | 338/25 |
| 2001/0024464 A1 | * | 9/2001 | Green et al. | 374/179 |
| 2002/0172259 A1 | * | 11/2002 | Bach | 374/208 |

* cited by examiner

CONNECTORIZED HIGH-TEMPERATURE THERMOCOUPLE

BACKGROUND OF THE INVENTION

The present invention relates to temperature measurement technology, and more specifically, to a high-temperature connectorized thermocouple probe assembly. Particular utility for the present invention is found in temperature measurement in high-temperature areas of land gas turbines.

While a number of thermocouple devices are known in the art, temperature limitations have traditionally hindered the use of connectors in high-temperature thermocouple applications, e.g., in areas of land gas turbines where temperatures may reach 800 degrees F. or more. Due to high-temperature requirements for land gas turbines, thermocouples have been constructed with connections that are made inside junction boxes, instead of using connectors. Such junction boxes not only add substantial weight to the thermocouple device and degrade vibration performance, but also require a tool, e.g., a wrench, and extra time for installation and removal.

SUMMARY OF THE INVENTION

Accordingly, the present invention provides a thermocouple probe assembly that solves the foregoing problems of prior art devices, and also solves other problems and has particular advantages not specifically disclosed herein.

In one aspect, a thermocouple probe assembly consistent with the present invention comprises a thermocouple junction having a plurality of conductors, a high temperature connector having at least one conductor, a length of cable having at least one conductor coupling at least one of the conductors of the thermocouple junction with at least one conductor of the high temperature connector; and a bushing disposed around the length of cable.

The thermocouple probe assembly may further comprise a backshell, wherein the high temperature connector is coupled to the backshell, and wherein at least one conductor of the high temperature connector is coupled to at least one conductor of the length of cable within the backshell. The length of cable may comprise mineral insulated cable, which may be of Type K or Type N. The bushing may be adapted to mate with a corresponding stop in a device for housing the thermocouple probe assembly. The assembly may further comprise a protective tube disposed around at least a portion of the length of cable, and may also comprise a compression fitting and at least one ferrule compressed onto the protective tube inside the compression fitting. The high temperature connector may be adapted to mate with a corresponding connector to form a seal that is splash-proof, weather-proof, or water-resistant. The device for housing the thermocouple probe assembly may be a well or a shield. The thermocouple probe assembly may be removably disposed within the device in which it is housed. The high temperature connector may be adapted to operate in temperature ranges from approximately 500 to 1200 degrees F. The thermocouple probe assembly may be installed in, or adapted for removable installation into, at least a portion of a land gas turbine.

In another aspect, a thermocouple probe assembly consistent with the present invention comprises a thermocouple junction and a high temperature connector coupled to the thermocouple junction. The high-temperature connector connects to a cable, which carries the signal from the thermocouple junction to a controller, e.g., in a land gas turbine installation. The thermocouple probe assembly may further comprise a conductor coupling the thermocouple junction with the high temperature connector, and a bushing disposed around the conductor, wherein the bushing is adapted to mate with a corresponding stop in a device for housing the thermocouple probe assembly. The high temperature connector may be adapted to operate in temperature ranges from approximately 500 to 1200 degrees F.

In a further aspect, a land gas turbine system consistent with the present invention comprises a land gas turbine and a thermocouple probe assembly disposed at least partly within the land gas turbine, wherein the thermocouple probe assembly comprises a thermocouple junction and a high temperature connector coupled to the thermocouple junction. The high-temperature connector connects to a cable, which carries the signal from the thermocouple junction to a controller in the land gas turbine. The land gas turbine system may further comprise a device for housing the thermocouple probe assembly, wherein the thermocouple probe assembly further comprises a conductor coupling the thermocouple junction with the high temperature connector and a bushing disposed around the conductor, wherein the bushing is adapted to mate with a corresponding stop in the device for housing the thermocouple probe assembly. The high temperature connector may be adapted to operate in temperature ranges from approximately 500 to 1200 degrees F.

In still another aspect, a thermocouple probe assembly consistent with the present invention comprises a thermocouple junction having a plurality of conductors, a length of cable having at least one conductor coupled to at least one of the conductors of the thermocouple junction, a bushing disposed around the length of cable, a protective tube disposed around at least a portion of the length of cable, and a backshell disposed around at least a portion of the length of cable and around at least a portion of the protective tube.

In yet another aspect, a thermocouple probe assembly consistent with the present invention comprises a thermocouple junction having a plurality of conductors, a high temperature connector, a length of cable having at least one conductor coupled both to at least one of the conductors of the thermocouple junction and to the high temperature connector, a bushing disposed around the length of cable, a protective tube disposed around at least a portion of the length of cable, and a backshell disposed around at least a portion of the length of cable and around at least a portion of the protective tube, wherein the backshell is further coupled to the high temperature connector.

It will be appreciated by those skilled in the art that although the following Detailed Description will proceed with reference being made to preferred embodiments, the present invention is not intended to be limited to these preferred embodiments. Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
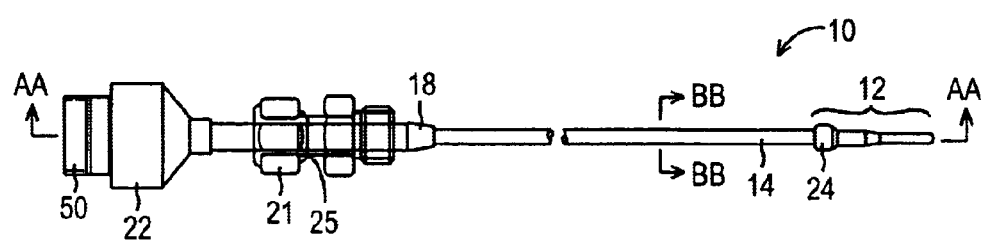
FIG. 1 depicts a side view of an exemplary thermocouple probe assembly consistent with the present invention.
Figure 2:
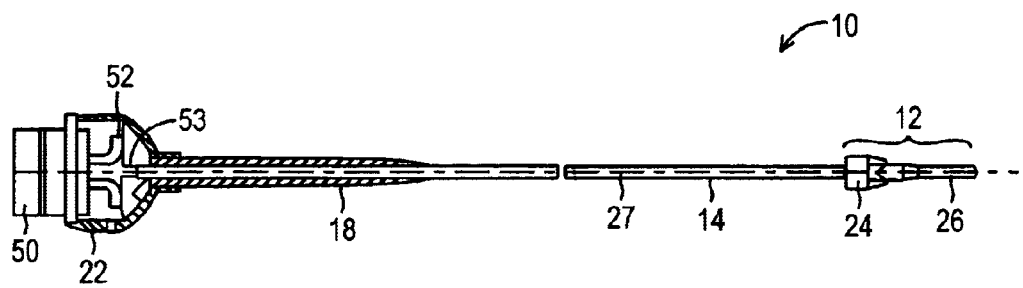
FIG. 2 depicts a partial cross-sectional view of the exemplary thermocouple probe assembly of FIG. 1, taken along line AA—AA.
Figure 3:
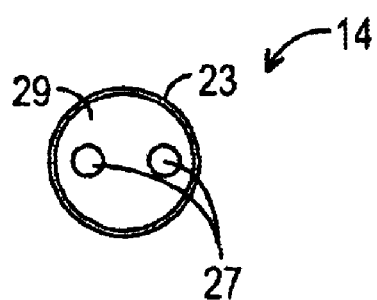
FIG. 3 is a cross-sectional view of the exemplary thermocouple probe assembly of FIG. 1, taken along line BB—BB.

FIG. 1 depicts a side view of an exemplary thermocouple probe assembly 10 in one embodiment consistent with the present invention; and FIG. 2 depicts a partial cross section of the thermocouple probe assembly 10 taken along line AA—AA; and FIG. 3 is a cross-sectional view of the exemplary thermocouple probe assembly of FIG. 1, taken along line BB—BB and illustrating a cross-section of the cable segment 14. With reference now to FIGS. 1, 2 and 3, the thermocouple probe assembly 10 of this exemplary embodiment comprises a thermocouple probe tip portion 12 that includes a thermocouple junction 26 coupled to a tapered bushing 24. The thermocouple probe tip 12 and bushing 24 are attached via a cable segment 14 to a backshell 22 via a protective tube 18 swaged onto the cable segment 14. The backshell 22 houses a plurality of bent contacts 52, each coupled both to a conductor 53 of the thermocouple (e.g., by welding) and to a corresponding pin (not shown) of a high temperature connector 50, e.g., a connector adapted to withstand high temperatures, e.g., temperature ranges from approximately 500 to 1200 degrees F.

The cable segment 14 comprises, e.g., Type K or N mineral insulated cable, which has sufficient flexibility to resist breakage when the entire thermocouple probe assembly 10 is fixed at either end but stiff enough to allow the probe to be inserted into the protective tube 18. As shown in FIG. 3, the cable segment 14 comprises a plurality of conductors 27 insulated with a highly compressed refractory mineral insulation 29 (e.g., MgO) enclosed in a liquid-tight and gas-tight continuous metal sheath 23, e.g., a copper or stainless steel sheath.

Figure 4:
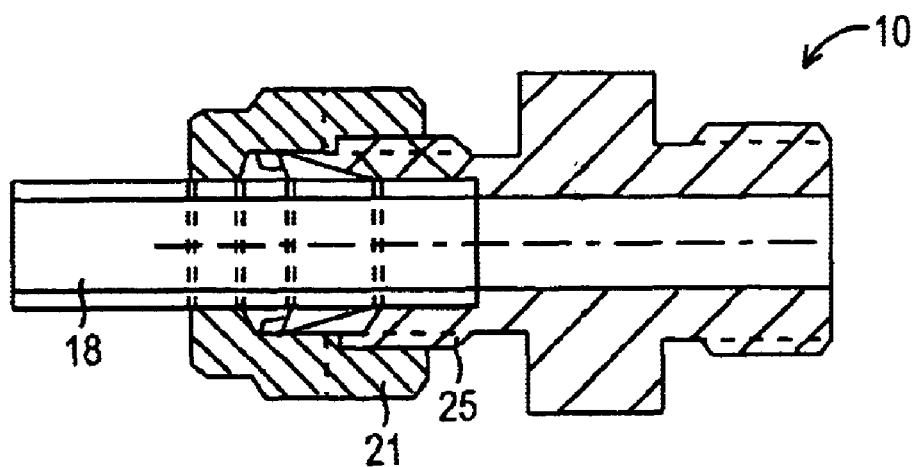
FIG. 4 depicts a detailed cross-sectional view of the fitting of the exemplary thermocouple probe assembly of FIG. 1.

FIG. 4 depicts a detailed cross-sectional view of the fitting of the exemplary thermocouple probe assembly 10 of FIG. 1. As shown in FIG. 4, a ferrule 25 is disposed about the protective tube 18. One or more ferrules 25, which are compressible tubular fitting, are compressed onto the protective tube 18 inside a compression fitting 21 to form a gas-tight seal. The ferrules cut into the metal of the protective tube 18 when secured. In this configuration, the fitting 21 engages directly with the protective tube 18, thereby preventing potential damage to the metal sheath 23 of the cable segment 14 that might otherwise result if the fitting were installed directly onto the cable segment 14, wherein a weakened metal sheath 23 could cause failures in the field.

Figure 5:
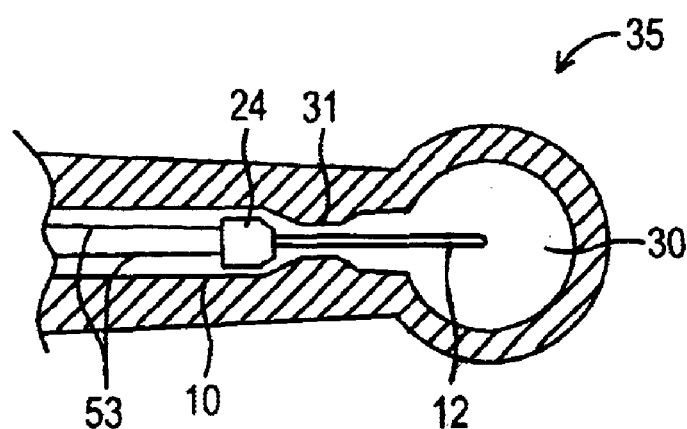
FIG. 5 depicts the tip of the exemplary thermocouple probe assembly of FIG. 1 in an exemplary installation in a shield or well in a land gas turbine.

FIG. 5 depicts the tip 12 of the exemplary thermocouple probe assembly 10 of FIG. 1 in an exemplary installation in a shield or well 35 in a land gas turbine (not shown). The thermocouple probe assembly 10 is inserted such that the tapered bushing 24 mates against a tapered stop 31 formed within the probe tube, and the probe tip 12 extending beyond the bushing 24 and stop 31 is disposed in a cavity 30 of the shield or well 35. The bushing 24 and the stop 31, when mated together, form a stop mechanism that secures the thermocouple probe assembly 10 to the shield or well 35 and stops the thermocouple when proper immersion depth in the cavity 30 is reached. The stop mechanism is provided in the exemplary embodiment to allow the thermocouple probe assembly to be easily removable. Tapered surfaces are used in the stop mechanism to allow easy disengagement during transient thermal growth. This minimizes thermal stress due to thermal expansion. Those skilled in the art should recognize that the bushing and stop do not necessarily have to be tapered and may be of any shape and size adapted to mate with one another.

Figure 6:
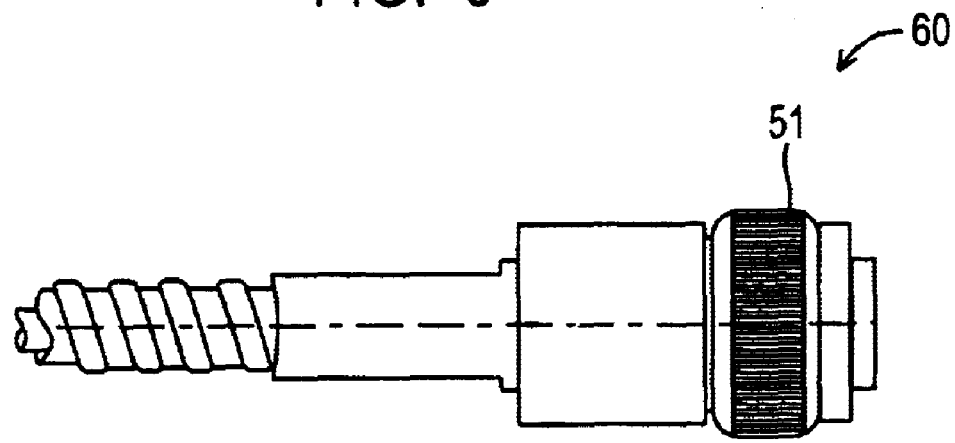
FIG. 6 depicts a cable having an exemplary female connector adapted to mate with the corresponding male connector of the probe assembly of FIG. 1.

FIG. 6 depicts a cable 60 having an exemplary female connector 51 adapted to mate with the corresponding male connector 50 of the probe assembly (not shown) of FIG. 1. In the exemplary embodiment described herein, the connector 50 of the probe assembly has male pins (not shown) and the connector 51 of the cable 60 has female components (not shown) adapted to receive the pins of the male connector 50. This configuration eliminates the need for a junction box, which adds unnecessary weight to the thermocouple device and requires tools, e.g., a wrench, to install and remove the thermocouple probe assembly. Also, improved vibration performance is achieved over the junction box design. Further, with the thermocouple probe assembly 10 of the present invention, field retrofits are thereby made much easier and quicker, as no tools are required to install, remove and/or replace the thermocouple probe assembly other than a wrench to loosen the fitting 21. Since the present invention provides reduced installation time, field labor cost is thereby improved. Further, the contact elements (not shown) in the connector 50 are not exposed to the environment, and when mated properly with a corresponding connector 51 provides protection from the environment, e.g., rain. Accordingly, environmentally-sealing connectors 50, 51 may be employed, and additionally, the connector 50 on the thermocouple probe assembly 10 may be welded to the backshell 22 to maintain a hermetic seal within the thermocouple probe assembly 10.

It should be noted that a bushing in a thermocouple probe assembly consistent with the present invention is desirably constructed from a dissimilar metal as the shield or well in which it is disposed, and from a metal having a slightly lower thermal expansion coefficient than that of the metal of the shield or well. The reason for this is that if the bushing expands more quickly than the metal of the shield or well, there is an increased potential for seizing during ramp-up, which could render the probe assembly non-removable.

Thus, there has been provided a thermocouple probe assembly that provides high-temperature operability, connectors for easy removal and installation, an environmentally sealed coupling between the connectors, elimination of the need for a junction box, reduced vibration performance, as detailed above. Those skilled in the art will recognize numerous modifications to the present invention, and all such modifications are deemed within the scope of the present invention, only as limited by the claims.

What is claimed is:

1. A thermocouple probe assembly comprising:
a thermocouple junction having a plurality of conductors;
a high temperature connector having at least one conductor, said high temperature connector adapted to operate in a temperature range from approximately 500 to 1200 degrees F.;
a backshell adjacent to said high temperature connector;
a length of cable comprising an insulator and at least one conductor coupling at least one of the conductors of said thermocouple junction with said at least one conductor of said high temperature connector, said insulator encasing at least a portion of the conductor of said length of cable; and a bushing disposed around said length of cable;

wherein said high temperature connector is coupled to said backshell;

wherein said at least one conductor of said high temperature connector is coupled to said at least one conductor of said length of cable within said backshell; and wherein said backshell houses at least a portion of the insulator of said length of cable.

2. A thermocouple probe assembly as claimed in claim 1, wherein said length of cable comprises mineral insulated cable.

3. A thermocouple probe assembly as claimed in claim 2, wherein said mineral insulated cable is of Type K or Type N.

4. A thermocouple probe assembly as claimed in claim 1, wherein said bushing is adapted to mate with a corresponding stop in a device for housing the thermocouple probe assembly.

5. A thermocouple probe assembly as claimed in claim 4, wherein said thermocouple probe assembly is removably disposed within said device for housing the thermocouple probe assembly.

6. A thermocouple probe assembly as claimed in claim 4, wherein said device for housing the thermocouple probe assembly is a well or a shield.

7. A thermocouple probe assembly as claimed in claim 1, further comprising a protective tube disposed around at least a portion of said length of cable.

8. A thermocouple probe assembly as claimed in claim 7, further comprising a compression fitting and at least one ferrule compressed onto said protective tube inside said compression fitting.

9. A thermocouple probe assembly as claimed in claim 1, wherein said high temperature connector is adapted to mate with a corresponding connector to form an environmentally sealed connection.

10. A thermocouple probe assembly as claimed in claim 1, wherein said thermocouple probe assembly is installed in, or adapted for removable installation into, at least a portion of a land gas turbine.

11. A thermocouple probe assembly as claimed in claim 1, wherein said thermocouple probe assembly is disposed in a well of a land gas turbine, said well comprising a metal;

wherein said bushing comprises a metal; and wherein the metal of the bushing has a thermal expansion coefficient lower than the thermal expansion coefficient of the metal of the well.

12. A thermocouple probe assembly as claimed in claim 1, wherein said thermocouple probe assembly is disposed in a well of a land gas turbine, said well comprising a metal;

wherein said bushing comprises a metal; and wherein the metal of the bushing is of a dissimilar type from the metal of the well.

13. A thermocouple probe assembly comprising:

a thermocouple junction and a high temperature connector coupled to the thermocouple junction, said high temperature connector adapted to operate in a temperature range from approximately 500 to 1200 degrees F.;

and a backshell adjacent to said high temperature connector;

wherein the thermocouple probe assembly further comprises a length of cable comprising an insulator and at least one conductor coupling at least one of the conductors of said thermocouple junction with said at least one conductor of said high temperature connector, said insulator encasing at least a portion of the conductor of said length of cable;

wherein said high temperature connector is coupled to said backshell;

wherein said at least one conductor of said high temperature connector is coupled to said at least one conductor of said length of cable within said backshell;

wherein said backshell houses at least a portion of the insulator of said length of cable; and wherein the thermocouple probe assembly is removably connected to, or is adapted for removable connection to a cable carrying a signal from the thermocouple junction to a controller in a land gas turbine.

14. A thermocouple probe assembly as claimed in claim 13, further comprising:

a conductor coupling said thermocouple junction to said high temperature connector; and a bushing disposed around said conductor.

15. A thermocouple probe assembly as claimed in claim 13, further comprising a bushing disposed around said length of cable;

wherein said thermocouple probe assembly is disposed in a well of a land gas turbine, said well comprising a metal;

wherein said bushing comprises a metal; and wherein the metal of the bushing has a thermal expansion coefficient lower than the thermal expansion coefficient of the metal of the well.

16. A thermocouple probe assembly as claimed in claim 13, further comprising a bushing disposed around said length of cable;

wherein said thermocouple probe assembly is disposed in a well of a land gas turbine, said well comprising a metal;

wherein said bushing comprises a metal; and wherein the metal of the bushing is of a dissimilar type from the metal of the well.

17. A land gas turbine system comprising:

a land gas turbine comprising a well and a controller; and a thermocouple probe assembly disposed in said well;

wherein the thermocouple probe assembly comprises a thermocouple junction and a high temperature connector coupled to the thermocouple junction, said high temperature connector adapted to operate in a temperature range from approximately 500 to 1200 degrees F., and further comprises a backshell adjacent to said high temperature connector; wherein the thermocouple probe assembly further comprises a length of cable comprising an insulator and at least one conductor coupling at least one of the conductors of said thermocouple junction with said at least one conductor of said high temperature connector, said insulator encasing at least a portion of the conductor of said length of cable;

wherein said high temperature connector is coupled to said backshell;

wherein said at least one conductor of said high temperature connector is coupled to said at least one conductor of said length of cable within said backshell;

wherein said backshell houses at least a portion of the insulator of said length of cable; and wherein the thermocouple probe assembly is removably connected to, or is adapted for removable connection to a cable carrying a signal from the thermocouple junction to said controller.

18. A land gas turbine system as claimed in claim 17, wherein said well comprises a stop, and wherein the thermocouple probe assembly further comprises a bushing adapted to mate with said stop.

19. A thermocouple probe assembly as claimed in claim 17, comprising a bushing disposed around said length of cable;
wherein said thermocouple probe assembly is disposed in a well of a land gas turbine, said well comprising a metal;
wherein said bushing comprises a metal; and
wherein the metal of the bushing has a thermal expansion coefficient lower than the thermal expansion coefficient of the metal of the well.

20. A thermocouple probe assembly as claimed in claim 17, further comprising a bushing disposed around said length of cable;
wherein said thermocouple probe assembly is disposed in a well of a land gas turbine, said well comprising a metal;
wherein said bushing comprises a metal; and wherein the metal of the bushing is of a dissimilar type from the metal of the well.

21. A land gas turbine system comprising:
a land gas turbine comprising a well and a controller; and
a thermocouple probe assembly disposed in said well;
wherein the thermocouple probe assembly comprises a thermocouple junction and a high temperature connector coupled to the thermocouple junction, said high temperature connector adapted to operate in a temperature range from approximately 500 to 1200 degrees F.;
wherein the thermocouple probe assembly is removably connected to, or is adapted for removable connection to a cable carrying a signal from the thermocouple junction to said controller;
wherein said well comprises a stop, and wherein the thermocouple probe assembly further comprises a bushing adapted to mate with said stop; and
wherein said well comprises a metal; and wherein said bushing comprises a metal having a thermal expansion coefficient lower than the thermal expansion coefficient of the metal of said well.

22. A land gas turbine system comprising:
a land gas turbine comprising a well and a controller; and
a thermocouple probe assembly disposed in said well;
wherein the thermocouple probe assembly comprises a thermocouple junction and a high temperature connector coupled to the thermocouple junction, said high temperature connector adapted to operate in a temperature range from approximately 500 to 1200 degrees F.;
wherein the thermocouple probe assembly is removably connected to, or is adapted for removable connection to a cable carrying a signal from the thermocouple junction to said controller;
wherein said well comprises a stop, and wherein the thermocouple probe assembly further comprises a bushing adapted to mate with said stop; and
wherein said well comprises a metal; and wherein said bushing comprises a dissimilar metal from the metal of said well.

* * * * *